(12) United States Patent
Schroeter

(10) Patent No.: US 8,504,365 B2
(45) Date of Patent: Aug. 6, 2013

(54) SYSTEM AND METHOD FOR DETECTING SYNTHETIC SPEAKER VERIFICATION

(75) Inventor: Horst Schroeter, New Providence, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1030 days.

(21) Appl. No.: 12/101,482

(22) Filed: Apr. 11, 2008

(65) Prior Publication Data
US 2009/0259468 A1   Oct. 15, 2009

(51) Int. Cl.
*G10L 17/00*   (2006.01)
(52) U.S. Cl.
USPC ........... 704/246; 704/275; 704/273; 704/271; 704/252; 704/250; 704/248; 704/247; 704/243; 704/223; 704/219; 704/208; 455/563; 379/361; 340/5.52; 713/169
(58) Field of Classification Search
USPC ............... 704/250, 273, 275, 271, 252, 248, 704/247, 246, 243, 223, 219, 208; 455/563; 379/361; 340/5.52; 713/169
See application file for complete search history.

(56) References Cited

U.S. PATENT DOCUMENTS

| | | | | |
|---|---|---|---|---|
| 5,774,837 A * | 6/1998 | Yeldener et al. | ............... | 704/208 |
| 5,806,040 A * | 9/1998 | Vensko | ............... | 704/273 |
| 5,933,803 A * | 8/1999 | Ojala | ............... | 704/223 |
| 5,937,381 A * | 8/1999 | Huang et al. | ............... | 704/247 |
| 5,940,799 A * | 8/1999 | Bruckert et al. | ............... | 704/273 |
| 6,014,441 A * | 1/2000 | Mark | ............... | 379/361 |
| 6,107,935 A * | 8/2000 | Comerford et al. | ........... | 340/5.52 |
| 6,141,644 A * | 10/2000 | Kuhn et al. | ............... | 704/273 |
| 6,272,463 B1 * | 8/2001 | Lapere | ............... | 704/248 |
| 6,314,401 B1 * | 11/2001 | Abbe et al. | ............... | 704/273 |
| 6,393,305 B1 * | 5/2002 | Ulvinen et al. | ............... | 455/563 |
| 6,401,066 B1 * | 6/2002 | McIntosh | ............... | 704/273 |
| 6,546,369 B1 * | 4/2003 | Buth et al. | ............... | 704/275 |
| 6,694,295 B2 * | 2/2004 | Lindholm et al. | ............. | 704/252 |
| 7,222,072 B2 * | 5/2007 | Chang | ............... | 704/250 |
| 2002/0178359 A1 * | 11/2002 | Baumeister et al. | .......... | 713/169 |
| 2002/0194005 A1 * | 12/2002 | Lahr | ............... | 704/271 |
| 2003/0046083 A1 * | 3/2003 | Devinney et al. | ............. | 704/273 |
| 2005/0171771 A1 * | 8/2005 | Yasunaga et al. | ............. | 704/219 |
| 2007/0124144 A1 * | 5/2007 | Johnson | ............... | 704/246 |
| 2008/0140420 A1 * | 6/2008 | Lee | ............... | 704/273 |
| 2008/0208578 A1 * | 8/2008 | Geller | ............... | 704/243 |

* cited by examiner

*Primary Examiner* — Michael Colucci

(57) ABSTRACT

Disclosed herein are systems, methods, and tangible computer readable-media for detecting synthetic speaker verification. The method comprises receiving a plurality of speech samples of the same word or phrase for verification, comparing each of the plurality of speech samples to each other, denying verification if the plurality of speech samples demonstrate little variance over time or are the same, and verifying the plurality of speech samples if the plurality of speech samples demonstrates sufficient variance over time. One embodiment further adds that each of the plurality of speech samples is collected at different times or in different contexts. In other embodiments, variance is based on a pre-determined threshold or the threshold for variance is adjusted based on a need for authentication certainty. In another embodiment, if the initial comparison is inconclusive, additional speech samples are received.

15 Claims, 2 Drawing Sheets

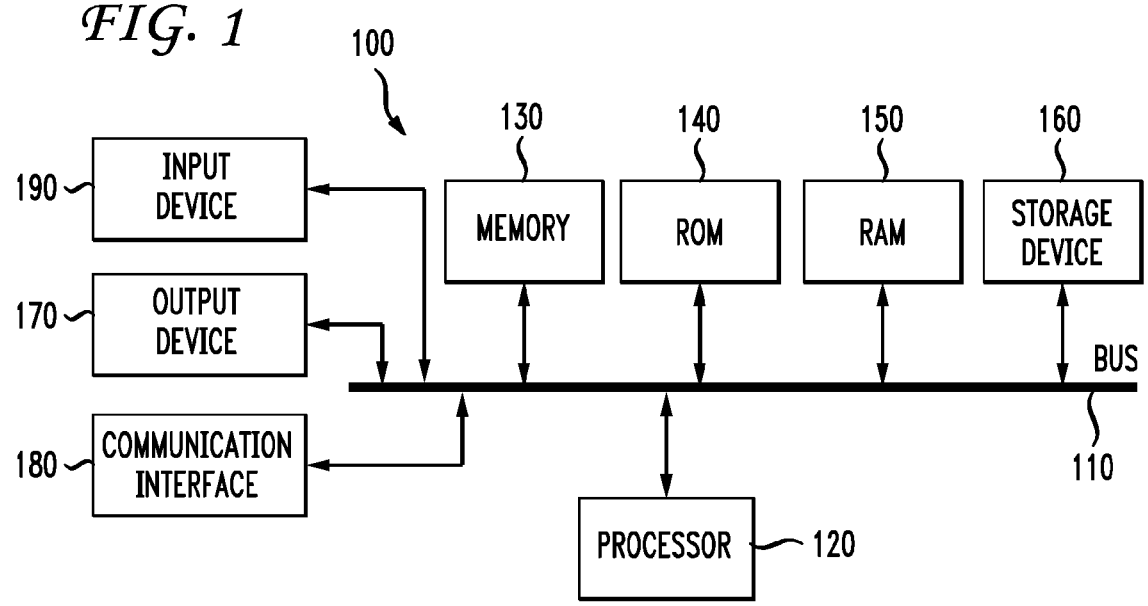
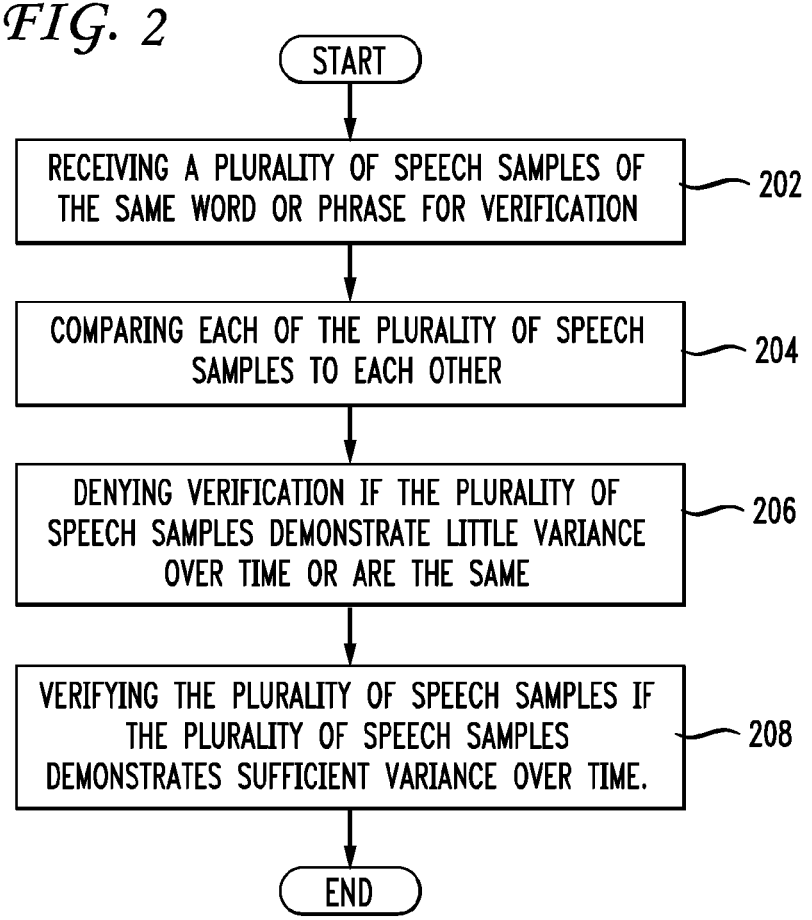

SYSTEM AND METHOD FOR DETECTING SYNTHETIC SPEAKER VERIFICATION

BACKGROUND OF THE INVENTION

1. Field of the Invention

The present invention relates to speaker verification and more specifically to synthetic attempts at speaker verification.

2. Introduction

Speaker and speech authentication systems are becoming more prevalent as speech recognition technology has improved and becomes available in cheaper, more reliable forms. As a biometric identification process, speech authentication systems are easy for users to interact with because there is nothing to forget or lose. Other biometric identification means exist, such as fingerprints or retinal scans, but hardware to accept such inputs are not widespread while microphones capable of receiving a speech sample are very widespread and integrated into many devices.

While using speech as a means of identification can be convenient for businesses and users, speech synthesis technology has also improved as a corollary of speech recognition. Speech synthesis technology can be used to defeat or trick speech authentication systems, lessening their effectiveness. While technology for recording someone's voice saying a particular password has been available for decades, that deceptive approach is simple enough to circumvent by requiring a different word to be spoken for speech identification so the would-be deceiver needs to not only record a speech sample, but also predict which word will be required for authentication.

Speech recognition systems may require any word to be spoken, thereby defeating the traditional attack of a pre-recorded speech library. Speech synthesis systems can replicate practically any voice, and presumably, any word or phrase. Speech recognition systems are unable to detect between the original, authentic speech and synthetic speech, potentially leading to confusion and security breaches.

Accordingly, what is needed in the art is a way of detecting speech synthesis-based attempted breaches on speech recognition and authentication systems.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems, methods and computer-readable media for detecting synthetic speaker verification. The system of the present disclosure is based on receiving a plurality of speech samples of the same word or phrase for verification, comparing each of the plurality of speech samples to each other, denying verification if the plurality of speech samples demonstrates little variance over time or are the same, and verifying the plurality of speech samples if the plurality of speech samples demonstrates sufficient variance over time.

The systems, methods, and computer-readable media may be compatible for use with speech recognition based biometric verification. In one embodiment, each of the plurality of speech samples is collected at different times or in different contexts. In other embodiments, variance is based on a predetermined threshold which is adjusted based on a need for authentication certainty or security. In a third embodiment, additional speech samples are received for further comparison if the initial comparison is inconclusive.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which:

FIG. 1 illustrates an example system embodiment;

FIG. 2 illustrates a method embodiment for detecting synthetic speaker verification;

DETAILED DESCRIPTION

Figure 3:
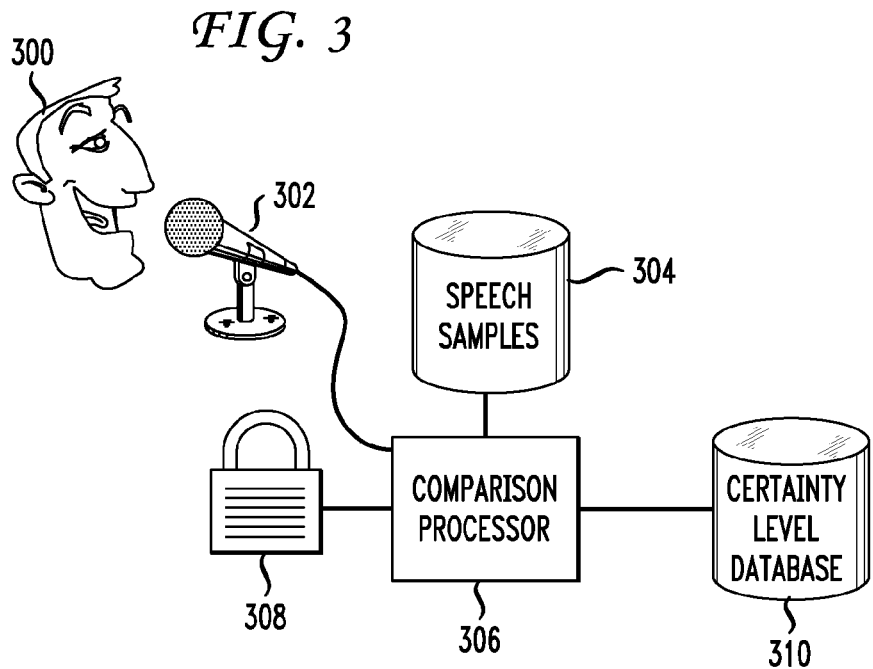
FIG. 3 illustrates an exemplary system for allowing or denying access.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

With reference to FIG. 1, an exemplary system includes a general-purpose computing device 1100, including a processing unit (CPU) 120 and a system bus 1110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. System bus 1110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 1110 by a drive interface. The drives and the associated computer readable media provide nonvolatile storage of computer readable instructions, data structures, program modules and other data for the computing device 100. In one aspect, a hardware module that performs a particular function includes the software component stored in a computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

FIG. 2 illustrates a method embodiment for adaptive media playback. The method may be practiced on any system or device depending on the particular application. First, the method receives a plurality of speech samples of the same word or phrase for verification (202). One aspect of the method is speech samples as short as one word. One common example is a user's first name. While a name is a possible requested speech sample, other non-personal words may also be desirable because a would-be deceiver could easily capture speech samples of a common word like a user's first name. In order to avoid false positives resulting from something as simple as a tape recorded speech sample as well as synthetic speech, longer or more obscure words may be desired. For example, a randomly generated password is requested from the user like "granite", "earwig", or "nimbus".

The same principles that apply to words also apply to phrases. It would be simple to record common phrases like "hello, how are you?", whereas a more obscure phrase like "clowns infrequently scare children" would be more difficult.

In one aspect of the method, each of the plurality of speech samples is collected at different times or in different contexts. For example, an enrollment period and verification period is established in a speaker verification scheme. In an enrollment period, a user is asked to say multiple different words or phrases, and in a later verification period, the user is asked to repeat one or more of the different words or phrases. One or more speech samples are gathered in both the enrollment period and the verification period. In another embodiment, both speech samples are requested from the user one immediately after the other, effectively eliminating the enrollment period. For example, the system asks a user to say "swordfish" twice in a row, each instance of the word being a separate speech sample. A minimum of two speech samples is received for comparison. More speech samples can be received various times.

Second, the method compares each of the plurality of speech samples to each other 204. Third, the method denies verification if the plurality of speech samples demonstrates little variance over time or are the same 206. Those of skill in the art will understand the scope and process of identifying the level of variance between the speech samples. Fourth, the method verifies the plurality of speech samples if the plurality of speech samples demonstrates sufficient variance over time 208.

Comparing the speech samples to each other is a check if the speech samples are too similar (or even identical). The subtle flaws and inconsistencies of human speech as well as the repetitive nature of machine-based speech synthesis allow for such a comparison. Some examples of sources of flaws and inconsistencies of human speech include colds, aging of the speaker, evolving accents, and prosodic variations based on the person's mood, the time of day, context of the speech sample, background noise, etc. If the speech samples are too similar or identical, the speech samples are identified as synthetic. In other words, slight or small variations are expected in different voice samples of the same person.

In one aspect, variance is based on a pre-determined threshold. The threshold is determined based on security or other needs. In a highly secure environment, such as a military installation, a tighter threshold is employed. In a lower security environment, such as using a voice sample to unlock a cell phone in order to place a call, the threshold is much lower so users do not get annoyed or frustrated with a stricter threshold. In other words, the pre-determined threshold for variance is adjusted based on a need for authentication certainty.

One embodiment addresses the situation where, in some cases, an initial comparison between speech samples is inconclusive. The variance may be below the threshold, but close. The variance may be off the charts because a subsequent speech sample may be of a different word or phrase than previous speech samples. If the initial comparison is inconclusive for any reason, additional speech samples are received for further analysis. For example, a user could be prompted "Speech verification was inconclusive. Please repeat the pass phrase 'swordfish.'"

FIG. 3 illustrates an exemplary system for allowing or denying access based on checking if a speech sample is synthetic or not. This system adds to the conventional voice recognition authentication scheme the feature of checking if a purported matching speech sample is merely synthetically generated. First, the system gathers a speech sample from a user 300 through a microphone 302. The system performs this step multiple times to gather multiple speech samples. The collected speech samples are stored in a speech sample database 304. The system compares speech samples from a user using a comparison processor 306 to confirm that the user is the authentic. The comparison processor is designed to compare speech samples to determine if they are from the same person. If the speech samples are determined to be from the same person, the system compares the speech samples again to determine if they are too similar or are exactly the same. If so, then the speech samples are likely to be synthetically generated. The comparison processor retrieves from the certainty level database 310 one or more parameters for determining how similar is too similar. The certainty level database contains parameters for multiple tasks or voices. For example, the parameters regulating access to a janitorial closet are looser than those accessing the vault or the parameters for comparing the CEO's voice are tighter than those for comparing a temporary worker's voice. In one aspect, the comparison processor retrieves multiple certainty levels and either combines them into one comparison or performs multiple comparisons with different parameters.

When the comparison processor determines that the speech samples are a match and the match is not a synthetically generated match, the comparison processor communicates with an access mechanism 308. Access mechanism implementations include physical, electronic, and computer, such as a door lock, an electric fence, a computer login prompt, or any other device which can allow or deny access. The system illustrated contains one access mechanism, but multiple access mechanisms are also possible. In one aspect of the system, the certainty level database 310 contains unique parameters for each access mechanism 308.

Figure 4:
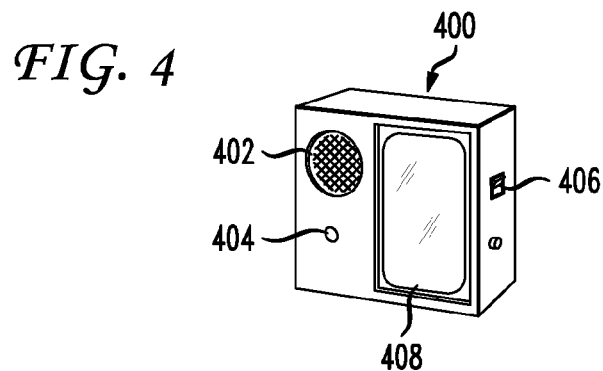
FIG. 4 illustrates an exemplary device as part of the system of FIG. 3.

FIG. 4 illustrates an exemplary device 400 as part of the system of FIG. 3. The device illustrated is designed to allow or deny passage through a doorway. The device includes a speaker 402 to communicate with a user. One situation where the device communicates with a user is prompting the user to say a word or phrase in order to gather a speech sample. The device can communicate in other ways with users, but a speaker is desirable because users are already speaking, and continuing the speech interface is a natural progression. The device has an integrated microphone 404 to capture speech samples. The device of FIG. 4 can either integrate within itself all or some of the speech samples database, the comparison processor, and the certainty level database in FIG. 3 or it can communicate with all or some of them remotely. When a speech sample is verified as authentic and non-synthetic, the access mechanism 406 is unlocked and allows passage through the door. The device may be used in locations where noise is not desired or the device may encounter users who are deaf. In these cases, a visual display 408 is included to communicate with the user. Typically such communications will elicit a speech sample from the user, inform the user that access is granted, or inform the user that access is denied, but other communications are contemplated.

Figure 5:
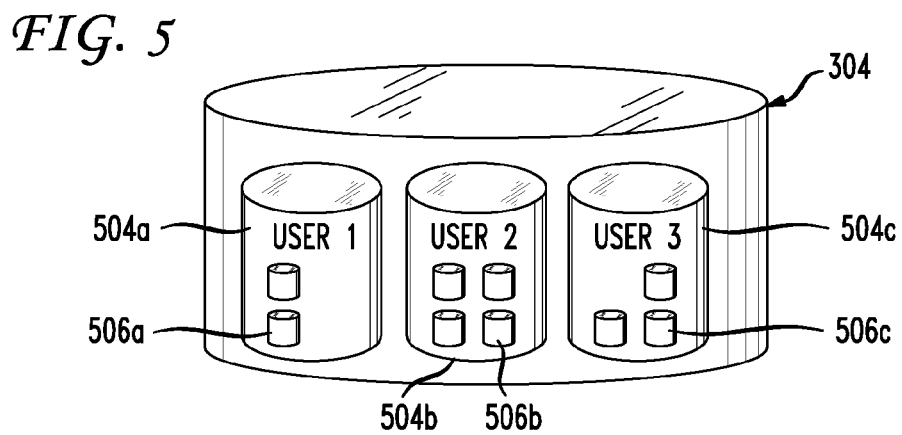
FIG. 5 illustrates a sample database of speech samples.

FIG. 5 illustrates a sample database of speech samples 304, as shown in FIG. 3. The speech sample database 304 contains three sub-databases 504a, 504b, 504c for each of user 1, user 2, and user 3. Each sub-database contains speech samples for individual users 506a, 506b, 506c. For example, different contexts may require different stores of speech for a respective user. For example, a different speech file may be created for each location where a user is—such as home, work and traveling on a train. As the system gathers speech samples, they are stored in their respective database. As synthetic speech samples are detected, they are stored in their respective database and flagged as non-authentic. If the same synthetic speech sample is received in the future, the system will be able to quickly determine that it was previously detected as synthetic and deny access.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. A "tangible" computer-readable medium expressly excludes software per se (not stored on a tangible medium) and a wireless, air interface. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the invention. For example, the processes described herein may have application in online banking, voice authorization for confidential or top-secret areas, or other areas where reliable biometric authentication is desired. Those skilled in the art will readily recognize various modifications and changes that may be made to the present invention without following the example embodiments and applications illustrated and described herein, and without departing from the true spirit and scope of the present invention.

I claim:

1. A method comprising:
    receiving a plurality of stored speech samples of a same word for verifying a user;
    comparing, via a processor, each of the plurality of stored speech samples to each other, to yield a variance over time;
    receiving speech from the user, distinct from the plurality of stored speech samples, to be verified;
    receiving a parameter that identifies a certainty level associated with the variance, from a plurality of certainty levels, to be applied when verifying the speech as authentic;
    based on the certainty level, verifying the speech as authentic, to yield a verification; and
    transmitting access data based on the verification.

2. The method of claim 1, wherein each of the plurality of speech samples is collected in one of a different time and in a different context.

3. The method of claim 1, wherein the certainty level is based on a predetermined threshold.

4. The method of claim 1, wherein each certainty level of the plurality of certainty levels is associated with a different task.

5. The method of claim 1, wherein each certainty level of the plurality of certainty levels is associated with a different user.

6. A system comprising:
    a processor;
    a computer-readable storage medium having instructions stored for controlling the processor to perform operations comprising:
        receiving a plurality of stored speech samples of a same word for verifying a user;
        comparing each of the plurality of stored speech samples to each other, to yield a variance over time;
        receiving speech from the user, distinct from the plurality of stored speech samples, to be verified;
        receiving a parameter that identifies a certainty level associated with the variance, from a plurality of certainty levels, to be applied when verifying the speech as authentic;
        based on the certainty level, verifying the speech as authentic, to yield a verification; and
        transmitting access data based on the verification.

7. The system of claim 6, wherein each of the plurality of speech samples is collected in one of a different time and in a different context.

8. The system of claim 6, wherein the certainty level is based on a predetermined threshold.

9. The system of claim 6, wherein each certainty level of the plurality of certainty levels is associated with a different task.

10. The system of claim 6, wherein each certainty level of the plurality of certainty levels is associated with a different user.

11. A computer-readable storage device having instructions stored for controlling a computing device to perform operations comprising:
    receiving a plurality of stored speech samples of a same word for verifying a user;
    comparing each of the plurality of stored speech samples to each other, to yield a variance over time;
    receiving speech from the user, distinct from the plurality of stored speech samples, to be verified;
    receiving a parameter that identifies a certainty level associated with the variance, from a plurality of certainty levels, to be applied when verifying the speech as authentic;
    based on the certainty level, verifying the speech as authentic, to yield a verification; and
    transmitting access data based on the verification.

12. The computer-readable storage device of claim 11, wherein each of the plurality of speech samples is collected in one of a different time and in a different context.

13. The computer-readable storage device of claim 11, wherein the certainty level is based on a predetermined threshold.

14. The computer-readable storage device of claim 11, wherein each certainty level of the plurality of certainty levels is associated with a different task.

15. The computer-readable storage device of claim 11, wherein each certainty level of the plurality of certainty levels is associated with a different user.

* * * * *